March 23, 1965   F. O. LUENBERGER   3,174,348
VARIABLE DIAMETER PULLEY STRUCTURE
Filed July 19, 1963
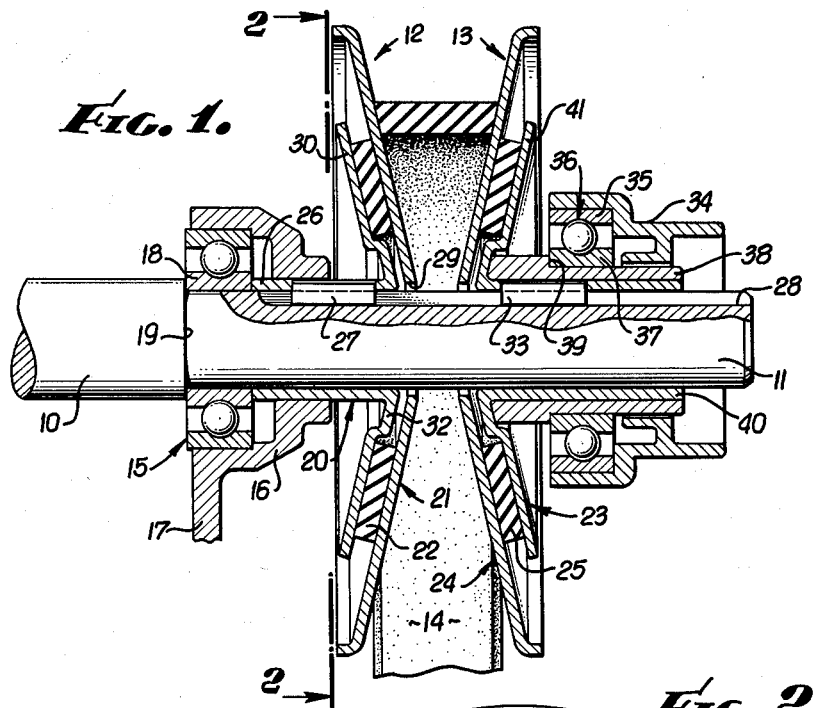
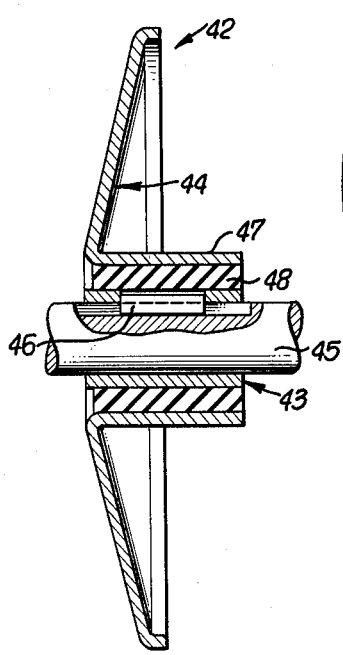
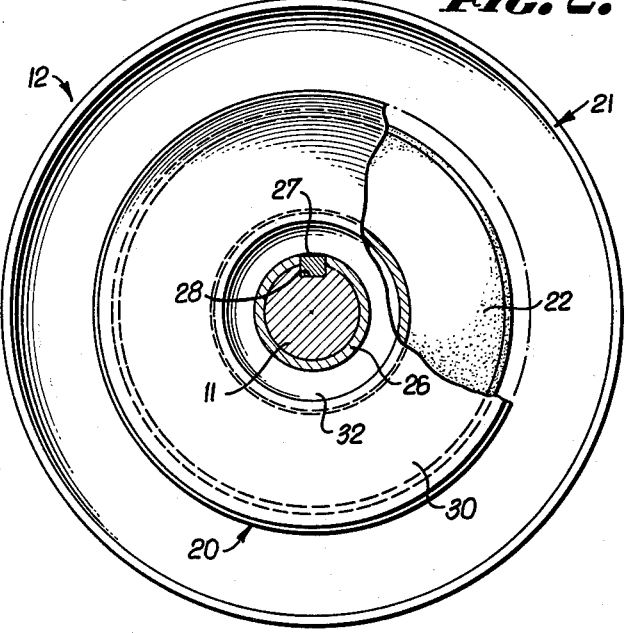
INVENTOR.
FREDERICK O. LUENBERGER
BY
Flam and Flam
ATTORNEYS.

3,174,348
VARIABLE DIAMETER PULLEY STRUCTURE
Frederick O. Luenberger, Los Angeles, Calif., assignor to Emerson Electric Co., a corporation of Missouri
Filed July 19, 1963, Ser. No. 296,286
6 Claims. (Cl. 74—230.17)

This invention relates to variable ratio transmissions, and particularly to transmissions utilizing variable diameter pulleys and edge active flexible belts.

Proper operation of such transmissions is predicated upon the width of the belt between its active edges being constant. Even minor surface irregularities in the belt can cause vibration, with consequent imposition of shock upon the load as well as upon the transmission itself. As a result of such vibrations, parts wear at a rapid rate, and in such manner as to increase the amplitude of vibration. The belts, too, may suffer undue wear due to the vibrations such that their replacement is frequently required.

The primary object of this invention is to overcome the foregoing disadvantages, and provide smooth, quiet operation of a variable ratio transmission of this character. For this purpose, each pulley section is made in two parts, a cone part and a hub part. Resilient means, such as pads, of elastomeric material, is interposed between the cone part and the hub part. In this way the vibrations are damped and thus isolated from the hubs, the shafts, and other parts of the transmission and load.

Another object of this invention is to provide simplified structures embodying the present invention. For this purpose, the cone part of the pulley section is actually mounted by the resilient pad material, the resilient material being directly adhered to the respective parts.

This invention possesses many other advantages, and has other objects which may be made more clearly apparent from a consideration of several embodiments of the invention. For this purpose, there are shown a few forms in the drawings accompanying and forming part of the present specification, and which drawings are true scale. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is an axial sectional view illustrating a portion of a variable ratio transmission mechanism incorporating the present invention;

FIG. 2 is a sectional view taken along the plane corresponding to line 2—2 of FIG. 1; and FIG. 3 is a fragmentary sectional view illustrating a modified pulley section.

In FIG. 1 there is illustrated a driving shaft 10 of a variable ratio transmission mechanism generally of the type shown and described in my prior Patent No. 2,398,235, issued April 9, 1946, and entitled Variable Ratio Transmission.

Mounted upon a reduced end 11 of the shaft 10 is a pulley structure comprising a pair of adjustably spaced, opposed pulley cone sections 12 and 13. A belt 14 has bevelled edges respectively contacting the opposed surfaces of the pulley sections. A driven shaft (not shown) carries a generally similar pulley structure engaged by the belt for transmission of power between the shafts.

The shaft 10 is rotatably supported by the aid of a bearing structure 15 mounted in a cup 16 formed in a housing wall 17. The bearing 15 has an inner race 18 that abuts a shoulder 19 formed by the reduced end 11 of the shaft 10.

In the present instance, the pulley section 12 is held at a fixed axial position and the pulley section 13 is axially movable so as to change the effective pulley diameter. In certain applications, both pulley sections might be movable.

The pulley section 12 includes a hub or mounting part 20, a cone part 21, and a resilient flexible pad 22. The companion pulley section 13 similarly includes a hub part 23, a cone part 24, and a resilient pad 25. The hub part 20 of the pulley section 12 has a central sleeve 26 that telescopes over the shaft extension 11 and abuts the inner race 18 of the bearing structure 15. A key 27, accommodated in a keyway 28 of the extension, rotatably couples the hub sleeve 26 to the shaft 10.

The cone part 21 of the pulley section 12 provides the surface engaged by the belt 14 and has a central aperture 29 at its apex extending with slight clearance about the shaft extension 11. The cone part 21 is mounted in this position by the hub part 20. For this purpose, the hub part 20 has a conical flange 30 that extends behind the cone part 21. The pad 22, which is of ring configuration, has generally conical surfaces on opposite sides respectively attached to the flange 30 and the cone part 21. In order to accomplish such attachment, a suitable adhesive or bonding agent may be used. To facilitate the placement of the pad 22 during attachment, the flange 30 has an intermediate offset portion at 32 that telescopes into the central aperture of the pad 22.

The companion pulley section 13 is formed in an identical manner and its hub part 23 is telescoped over the end of the shaft extension 11 and rotatably coupled thereto by a key 33.

As the pulley sections are moved toward and away from each other, the effective diameter of the pulley structure is varied and the belt 14 rides outwardly or inwardly relative to the axis of the shafts 10, 11. The pads 22 and 25 isolate from the hub parts 20 and 23 vibrations due to minor surface irregularities in the edges of the belt 14.

Preferably the pads 22 and 25 are made as a single piece of elastomeric material having adequate shear strength for transferring power within the rating of the machine 14. However, the pads could be made as a series of separated pad segments spaced equiangularly about the axis of the pulley. The material forming the pads 22 and 25 may have a very high bulk modulus of elasticity so that as the cone parts 21 and 24 tilt to accommodate to the surface contour of the belt 14, the material of the pads 22 and 25 bulges slightly. The pads 22 and 25 may be reinforced, if desired, by circularly extending cords or fibers having suitable tensile strength characteristics.

In the present instance, the pulley section 13 is moved axially by the aid of a non-rotary shift collar 34 in order to adjust the ratio of the transmission. The shift collar 34 is attached to the outer race 35 of a roller bearing structure 36. The inner race 37 of the bearing structure 36 is mounted upon a thrust sleeve 38 and against a shoulder 39 formed intermediate the length thereof. The thrust sleeve 35 in turn fits over the sleeve 40 of the hub part 23. Accordingly, as the shift collar 34 is moved to the left as viewed in FIG. 1, the thrust sleeve 38 causes movement of the pulley section 13 by engaging the central part of the conical flange 41 projecting from the hub part 23. As the shift collar 34 is moved to the right, the tension in the belt 14 causes the pulley section 13 to follow. The cone parts 21 and 24 have operative conical surfaces extending quite close to the shaft extension 11 and hence allow the maximum range of radial adjustment in the position of the belt 14.

In place of bonding or adhering the respective faces of the pads 22 and 25 to the pulley section parts, other fastening devices could be used.

In the form of the invention illustrated in FIG. 3, there is shown a pulley section 42 comprising a hub part 43 and a cone part 44. The hub part 43 is in the form of a sleeve telescopingly accommodated on a shaft 45 and rotatably coupled thereto by a key 46. The cone part 44 has at the center thereof a cylindrical flange 47 that extends in exteriorly encompassing relationship about the hub part 43. Between the flange 47 and the hub 43 is a cylindrical resilient pad mounting member 48 made of material similar to pads 22 and 25. The interior and exterior cylindrical surfaces of the pad 48 are respectively adhered to the hub 43 and the flange 47. The ends of the pad are free so as to allow bulging as the cone part 44 tilts to a minor degree to conform to the belt.

The inventor claims:

1. In a variable ratio transmission mechanism: a shaft; a pair of relatively axially movable pulley sections cooperable with a belt, at least one of said pulley sections having a mounting part slidable along the shaft and a cone part; and vibration damping means interposed between the mounting part and the cone part, and forming the operative connection between said parts for transmission of torque therebetween.

2. In a variable ratio transmission mechanism: a shaft; a pair of pulley sections cooperable with a belt, each pulley section having a mounting part and a cone part; the mounting part of at least one of said pulley sections being slidable along the shaft; and a resilient flexible pad interposed between the mounting part and the cone part for damping vibrations of the cone part, and forming the operative connection between said parts for transmission of torque therebetween.

3. In a variable ratio transmission mechanism: a shaft; a pair of pulley sections cooperable with a belt, each pulley section having a hub part and a cone part, the hub part having a conical flange paralleling the corresponding cone part, the hub part of at least one of said pulley sections being slidable along the shaft; and a resilient flexible ring between the flange and the cone part and serving as a mounting means for the cone part for transmission of torque between said parts.

4. In a variable ratio transmission mechanism: a shaft; a pair of pulley sections cooperable with a belt, each pulley section having a tubular hub part and a cone part, the cone part having a cylindrical flange extending in exterior encompassing relationship about the hub part, the hub part of at least one of said pulley sections being slidable along the shaft; and a resilient flexible sleeve between the flange and the hub part and serving as a mounting means for the cone part for transmission of torque between said parts.

5. In a variable ratio transmission mechanism: a shaft; a pair of pulley sections cooperable with a belt, each pulley section having a hub part and a cone part, the hub part having a conical flange paralleling the corresponding cone part, the hub part of at least one of said pulley sections being slidable along the shaft; and a resilient flexible ring between the flange and the cone part and serving as a mounting means for the cone part for transmission of torque between said parts, said ring being made of material having a high bulk modulus of elasticity, said ring having a free end surface.

6. In a variable ratio transmission mechanism: a shaft; a pair of pulley sections cooperable with a belt, each pulley section having a tubular hub part and a cone part, the cone part having a cylindrical flange extending in exterior encompassing relationship about the hub part, the hub part of at least one of said pulley sections being slidable along the shaft; and a resilient flexible sleeve between the flange and the hub part and serving as a mounting means for the cone part for transmission of torque between said parts, said sleeve being made of material having a high bulk modulus of elasticity, said sleeve having a free end surface.

References Cited by the Examiner

UNITED STATES PATENTS

| | | | |
|---|---|---|---|
| 1,894,432 | 1/33 | Watson | 74—230.5 X |
| 2,196,923 | 4/40 | Johanson | 74—230.01 |
| 2,199,954 | 5/40 | Kelsey | 74—230.01 X |
| 2,282,589 | 5/42 | Mayne | 74—230.01 X |
| 2,321,438 | 6/43 | Tyler | 74—230.17 |
| 2,898,142 | 8/59 | Kordes | 74—230.5 X |

DON A. WAITE, *Primary Examiner.*